(12) United States Patent
Luo et al.

(10) Patent No.: US 12,177,894 B2
(45) Date of Patent: Dec. 24, 2024

(54) DATA TRANSMISSION METHOD AND APPARATUS

(71) Applicant: Huawei Technologies Co., Ltd., Shenzhen (CN)

(72) Inventors: Zhihu Luo, Beijing (CN); Baokun Shan, Shenzhen (CN); Hong Wang, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 17/678,844

(22) Filed: Feb. 23, 2022

(65) Prior Publication Data

US 2022/0183054 A1  Jun. 9, 2022

Related U.S. Application Data

(63) Continuation of application No. PCT/CN2019/102361, filed on Aug. 23, 2019.

(51) Int. Cl.
*H04W 56/00* (2009.01)
*H04L 5/00* (2006.01)
(Continued)

(52) U.S. Cl.
CPC ......... *H04W 74/006* (2013.01); *H04L 5/0055* (2013.01); *H04W 68/02* (2013.01); *H04W 72/542* (2023.01)

(58) Field of Classification Search
CPC ............. H04W 74/006; H04W 5/0055; H04W 72/542; H04W 68/02
See application file for complete search history.

(56) References Cited

U.S. PATENT DOCUMENTS

| 2009/0047912 | A1* | 2/2009 | Lee | ........................ | H04L 1/1671 |
| | | | | | 455/69 |
| 2019/0350034 | A1* | 11/2019 | Choe | ..................... | H04W 76/27 |

(Continued)

FOREIGN PATENT DOCUMENTS

CN    110063085 A    7/2019

OTHER PUBLICATIONS

"Jln, Method For Performing A Random Access Procedure And Device Thereof, Nov. 12, 2019, CN 110447296" (Year: 2018).*

(Continued)

*Primary Examiner* — Sai Ming Chan
(74) *Attorney, Agent, or Firm* — Leydig, Voit & Mayer, Ltd.

(57) ABSTRACT

A data transmission method and apparatus are provided. The method includes: sending, by a terminal device, a message 1 including a random access preamble to a first network device; receiving DCI and a message 2 including downlink data scheduled by the DCI from the first network device, wherein the DCI and/or the message 2 include/includes first information, which is used to schedule ACK/NACK feedback information of the message 2; and sending the ACK/NACK feedback information to the first network device based on the first information. According to the application, the first information is used to schedule the ACK/NACK feedback information, therefore the terminal device may send the ACK/NACK feedback information of the message 2 to the first network device in an MT-EDT scenario based on the first information, thereby improving robustness of transmission of the downlink data in the message 2.

20 Claims, 4 Drawing Sheets

(51) Int. Cl.
  *H04W 68/02* (2009.01)
  *H04W 72/542* (2023.01)
  *H04W 74/00* (2009.01)

(56) References Cited

U.S. PATENT DOCUMENTS

2020/0374960 A1* 11/2020 Deenoo ............... H04B 7/0695
2021/0259013 A1* 8/2021 Wong .................. H04W 74/008

OTHER PUBLICATIONS

"선, Apparatus And Method For Semi-permanent Scheduling And Power Control In A Wireless Communication System, Nov. 20, 2023, KR 102604279" (Year: 2018).*

Nokia, Nokia Shanghai Bell, "Further analysis on Performance and Feasibility of service based GWUS," 3GPP TSG-RAN WG2 Meeting #106, Reno, USA, R2-1906622, total 6 pages, 3rd Generation Partnership Project, Valbonne, France (May 13-17, 2019).

Ericsson, "Scheduling enhancements," 3GPP TSG-RAN WG2 #106, Reno, USA, R2-1906932 (Revision of R2-1903835) total 8 pages, 3rd Generation Partnership Project, Valbonne, France (May 13-17, 2019).

Intel ,"Discussion to support MT-EDT," SA WG2 Meeting #134, Sapporo, Japan, S2-1907579, total 4 pages, 3rd Generation Partnership Project, Valbonne, France (Jun. 24-28, 2019).

"3rd Generation Partnership Project; Technical Specification Group Radio Access Network; Evolved Universal Terrestrial Radio Access (E-UTRA); Physical layer procedures (Release 13)," 3GPP TS 36.213 V13.14.0, total 395 pages, 3rd Generation Partnership Project, Valbonne, France (Jun. 2019).

"Report on [106#65][R16 NB-IoT/eMTC] CP MT-EDT," 3GPP TSG RAN WG2 Meeting #107, Prague, the Czech Republic, R2-1910386, Total 33 pages, 3rd Generation Partnership Project, Valbonne, France (Aug. 26-30, 2019).

* cited by examiner

DATA TRANSMISSION METHOD AND APPARATUS

CROSS-REFERENCE TO RELATED APPLICATIONS

This application is a continuation of International Application No. PCT/CN2019/102361, filed on Aug. 23, 2019, the disclosure of which is hereby incorporated by reference in its entirety.

TECHNICAL FIELD

Embodiments of this application relate to the field of wireless communication technologies, and in particular, to a data transmission method and an apparatus.

BACKGROUND

In a communication system such as a long term evolution (LTE) system, to perform data transmission between a terminal device and a base station, a radio resource control (RRC) connection needs to be first established by using a random access (RA) process. After the RRC connection is established, the data transmission may be performed between the terminal device and the base station.

A machine type communication (MTC) system or a narrowband internet of things (NB-IoT) system that is currently being discussed is different from a conventional LTE system, and data transmission of the MTC system or the NB-IoT system is characterized by a relatively small amount of data and an uncertain time of arrival of the data. In the 5th generation (5G) mobile communication standard that has been formulated at present, a mobile originated early data transmission (MO-EDT) technology is proposed based on the random access process. The MO-EDT technology is mainly used for uplink data transmission. If an amount of data that needs to be sent by the terminal device is relatively small and the data can be transmitted in one transport block (transmission block, TB), the terminal device may trigger an MO-EDT process, and transmit uplink data by using a message 3 in the MO-EDT process. In the MO-EDT process, the base station may send downlink data to the terminal device by using a message 4 in the MO-EDT process. After the MO-EDT process ends, the terminal device releases the connection to the base station and remains in an idle state. It can be learned from the foregoing process that the MO-EDT process is only for a scenario of uplink data transmission. The base station may also transmit the downlink data in the message 4 only when the base station currently has the downlink data that needs to be sent. A scenario in which the base station actively sends the downlink data is not supported.

Therefore, in view of the characteristic that a time of arrival of the downlink data is uncertain in the MTC system or the NB-IoT system, a downlink data transmission solution based on the random access process, namely, a mobile terminated early data transmission (MT-EDT) technology, is currently discussed. When the base station and a core network device need to transmit the downlink data, the base station and the core network device may actively trigger an MT-EDT process, and may send the downlink data by using a message 2 in the MT-EDT process. However, in this solution, after receiving the downlink data by using the message 2, how the terminal device sends feedback information of the message 2 that includes the downlink data to the base station is an urgent problem to be resolved, and there is no clear solution.

SUMMARY

An objective of implementations of this application is to provide a data transmission method and an apparatus, to resolve how a terminal device sends feedback information of a message 2 in an MT-EDT process.

According to a first aspect, an embodiment of this application provides a data transmission method, including: A terminal device sends a message 1 to a first network device, where the message 1 includes a random access preamble. The terminal device receives downlink control information (DCI) and a message 2 scheduled by the DCI from the first network device, where the message 2 includes downlink data, and the DCI and/or the message 2 include/includes first information, and the first information is used to schedule acknowledgement ACK/negative acknowledgement NACK feedback information of the message 2. The terminal device sends the ACK/NACK feedback information to the first network device based on the first information.

According to the foregoing method, the first information is used to schedule the ACK/NACK feedback information. Therefore, the terminal device may send the ACK/NACK feedback information of the message 2 to the first network device in an MT-EDT scenario and based on the first information included in the DCI and/or the message 2, to improve robustness of transmission of the downlink data in the message 2.

In a possible design, that the terminal device sends the ACK/NACK feedback information to the first network device based on the first information includes: The terminal device determines a time-frequency resource, a subcarrier spacing, and a repetition quantity of the ACK/NACK feedback information. The terminal device sends the ACK/NACK feedback information based on the time-frequency resource, the subcarrier spacing, and the repetition quantity, where the DCI or the message 2 includes the first information, and the first information includes one or more of the following:

first indication information, where the first indication information is used to determine a subcarrier spacing of subcarriers for transmitting the ACK/NACK feedback information; and second indication information, where the second indication information is used to determine the repetition quantity of the ACK/NACK feedback information.

In the foregoing method, the DCI or the message 2 indicates the subcarrier spacing of the subcarriers for transmitting the ACK/NACK feedback information and the repetition quantity, so that the ACK/NACK feedback information can be flexibly scheduled.

In a possible design, the DCI includes time-frequency resource information of the ACK/NACK feedback information, and when the first information includes only the first indication information, the repetition quantity of the ACK/NACK feedback information is indicated by a system message or is set: or when the first information includes only the second indication information, the subcarrier spacing of the subcarriers for transmitting the ACK/NACK feedback information is indicated by a system message or is set.

In the foregoing method, when the first information includes only a part of scheduling information, another part may be indicated by the system message or is set, thereby reducing overheads of the first information and improving resource utilization.

In a possible design, when the DCI includes the first information, the DCI includes at least one of a first field used to transmit the first indication information and a second field used to transmit the second indication information; and the first indication information is a status value of a bit included in the first field, and the second indication information is a status value of a bit included in the second field:
different status values of the bit included in the first field are used to indicate different subcarrier spacings; and
different status values of the bit included in the second field are used to indicate different repetition quantities.

In a possible design, when the message 2 includes the first information, the first information includes one or more of the following:
third indication information, where the third indication information is used to determine a location of the subcarrier for transmitting the ACK/NACK feedback information;
fourth indication information, where the fourth indication information is used to determine a scheduling delay of the ACK/NACK feedback information;
fifth indication information, where the fifth indication information is used to determine target receive power of the ACK/NACK feedback information;
sixth indication information, where the sixth indication information is used to determine a path loss compensation factor for transmitting the ACK/NACK feedback information; and
seventh indication information, where the seventh indication information is used to determine a timing advance for transmitting the ACK/NACK feedback information.

In the foregoing method, more pieces of indication information may be carried by using the message 2, a scheduling granularity may be finer, and scheduling is more flexible.

In a possible design, the DCI and the message 2 include the first information, where the first information includes first indication information and second indication information, the DCI includes the first indication information, and the message 2 includes the second indication information: or the DCI includes the second indication information, and the message 2 includes the first indication information; the first indication information is used to determine a subcarrier spacing of subcarriers for transmitting the ACK/NACK feedback information; and the second indication information is used to determine a repetition quantity of the ACK/NACK feedback information.

In the foregoing method, the DCI and the message 2 may be jointly used to carry the first information, to improve resource utilization.

In a possible design, before the terminal device sends the message 1 to the first network device, the method further includes: The terminal device receives a first paging message from the first network device, where the first paging message includes resource indication information, the resource indication information is used to indicate a random access channel RACH resource allocated to the terminal device, and the RACH resource is used to carry the message 1; and the RACH resource is allocated based on second information, and the second information includes paging-related capability information possessed by the terminal device.

In the foregoing method, the RACH resource is allocated based on the second information, so that a RACH resource matching a capability of the terminal device can be allocated to the terminal device, to improve resource utilization efficiency.

In a possible design, the second information includes one or more of the following:
first capability information, used to indicate whether the terminal device supports initiating random access on a non-anchor carrier;
second capability information, used to indicate whether the terminal device supports using a preamble format 2; and
third capability information, used to indicate whether the terminal device supports early data transmission EDT for user plane cellular internet of things evolved packet system CIOT EPS optimization.

In a possible design, before the terminal device receives the first paging message from the first network device, the method further includes: The terminal device sends the second information to the first network device.

According to a second aspect, this application further provides a communication apparatus. The communication apparatus has a function of implementing any method provided in the first aspect. The communication apparatus may be implemented by hardware, or may be implemented by hardware executing corresponding software. The hardware or the software includes one or more units or units corresponding to the foregoing function.

In a possible implementation, the communication apparatus includes a processor, and the processor is configured to support the communication apparatus in performing a corresponding function of the terminal device in the foregoing communication method. The communication apparatus may further include a memory, and the memory may be coupled to the processor, and store program instructions and data that are necessary for the communication apparatus. Optionally, the communication apparatus further includes a communication interface, and the communication interface is configured to support communication between the communication apparatus and a first network device.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to detailed descriptions in the method examples. Details are not described herein again.

According to a third aspect, this application provides a data transmission method, including: A first network device receives a message 1 from a terminal device, where the message 1 includes a random access preamble. The first network device sends downlink control information DCI and a message 2 scheduled by the DCI to the terminal device. The DCI and/or the message 2 include/includes first information, where the first information is used to schedule acknowledgement ACK/negative acknowledgement NACK feedback information of the message 2. The first network device receives the ACK/NACK feedback information from the terminal device.

According to the foregoing method, the first information is used to schedule the ACK/NACK feedback information. Therefore, the terminal device may send the ACK/NACK feedback information of the message 2 to the first network device in an MT-EDT scenario and based on the first information included in the DCI and/or the message 2, to improve robustness of transmission of downlink data in the message 2.

In a possible design, the DCI or the message 2 includes the first information, where the first information includes one or more of the following: first indication information, where the first indication information is used to determine a subcarrier spacing of subcarriers for transmitting the ACK/NACK feedback information; and second indication information, where the second indication information is used to determine a repetition quantity of the ACK/NACK feedback information.

In a possible design, when the DCI includes the first information, the DCI includes at least one of a first field used to transmit the first indication information and a second field used to transmit the second indication information; and the first indication information is a status value of a bit included in the first field, and the second indication information is a status value of a bit included in the second field:
different status values of the bit included in the first field are used to indicate different subcarrier spacings; and
different status values of the bit included in the second field are used to indicate different repetition quantities.

In a possible design, when the message 2 includes the first information, the first information includes one or more of the following:
third indication information, where the third indication information is used to determine a location of the subcarrier for transmitting the ACK/NACK feedback information;
fourth indication information, where the fourth indication information is used to determine a scheduling delay of the ACK/NACK feedback information;
fifth indication information, where the fifth indication information is used to determine target receive power of the ACK/NACK feedback information;
sixth indication information, where the sixth indication information is used to determine a path loss compensation factor for transmitting the ACK/NACK feedback information; and
seventh indication information, where the seventh indication information is used to determine a timing advance for transmitting the ACK/NACK feedback information.

In a possible design, the DCI includes time-frequency resource information of the ACK/NACK feedback information, and when the first information includes only the first indication information, the repetition quantity of the ACK/NACK feedback information is indicated by a system message or is set: or when the first information includes only the second indication information, the subcarrier spacing of the subcarriers for transmitting the ACK/NACK feedback information is indicated by a system message or is set.

In a possible design, the DCI and the message 2 include the first information, where the first information includes first indication information and second indication information, the DCI includes the first indication information, and the message 2 includes the second indication information: or the DCI includes the second indication information, and the message 2 includes the first indication information: the first indication information is used to determine a subcarrier spacing of subcarriers for transmitting the ACK/NACK feedback information; and the second indication information is used to determine a repetition quantity of the ACK/NACK feedback information.

In a possible design, before the first network device receives the message 1 from the terminal device, the method further includes: The first network device receives a second paging message from a second network device, where the second paging message includes second information, and the second information includes paging-related capability information possessed by the terminal device. The first network device allocates a random access channel RACH resource to the terminal device based on the second information, and determines, based on the second paging message, a first paging message to be sent to the terminal device, where the first paging message includes resource indication information, and the resource indication information is used to indicate the RACH resource. The first network device sends the first paging message to the terminal device.

In a possible design, the second information includes one or more of the following:
first capability information, used to indicate whether the terminal device supports initiating random access on a non-anchor carrier;
second capability information, used to indicate whether the terminal device supports using a preamble format 2; and
third capability information, used to indicate whether the terminal device supports early data transmission EDT for user plane cellular internet of things evolved packet system CIOT EPS optimization.

In a possible design, before the first network device receives the second paging message from the second network device, the method further includes: The first network device receives the second information from the terminal device, and sends the second information to the second network device.

According to a fourth aspect, this application further provides a communication apparatus. The communication apparatus has a function of implementing any method provided in the third aspect. The communication apparatus may be implemented by hardware, or may be implemented by hardware executing corresponding software. The hardware or the software includes one or more units or units corresponding to the foregoing function.

In a possible implementation, the communication apparatus includes a processor, and the processor is configured to support the communication apparatus in performing a corresponding function of the first network device in the foregoing communication method. The communication apparatus may further include a memory, and the memory may be coupled to the processor, and store program instructions and data that are necessary for the communication apparatus. Optionally, the communication apparatus further includes a communication interface, and the communication interface is configured to support communication between the communication apparatus and a terminal device.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to detailed descriptions in the method examples. Details are not described herein again.

According to a fifth aspect, this application further provides a data transmission method, including: A first network device receives a second paging message from a second network device, where the second paging message includes second information, and the second information includes paging-related capability information possessed by the terminal device. The first network device allocates a random access channel RACH resource to the terminal device based on the second information, and determines, based on the second paging message, a first paging message to be sent to the terminal device, where the first paging message includes resource indication information, and the resource indication information is used to indicate the RACH resource. The first network device sends the first paging message to the terminal device.

In the foregoing method, the RACH resource is allocated based on the second information, so that a RACH resource matching a capability of the terminal device can be allocated to the terminal device, to improve resource utilization efficiency.

In a possible design, the second information one or more of the following:
  first capability information, used to indicate whether the terminal device supports initiating random access on a non-anchor carrier;
  second capability information, used to indicate whether the terminal device supports using a preamble format 2; and
  third capability information, used to indicate whether the terminal device supports early data transmission EDT for user plane CIOT EPS optimization.

In a possible design, before the first network device receives the second paging message from the second network device, the method further includes: The first network device receives the second information from the terminal device, and sends the second information to the second network device.

According to a sixth aspect, this application further provides a data transmission method, including: A terminal device receives a first paging message from a first network device, where the first paging message includes resource indication information, and the resource indication information is used to indicate a random access channel RACH resource, and the RACH resource is allocated based on second information, where the second information includes capability information that is required for paging and that is possessed by the terminal device, and the terminal device sends a random access preamble to the first network device based on the RACH resource.

In the foregoing method, the RACH resource is allocated based on the second information, so that a RACH resource matching a capability of the terminal device can be allocated to the terminal device, to improve resource utilization efficiency.

In a possible design, the second information includes one or more of the following: first capability information, used to indicate whether the terminal device supports initiating random access on a non-anchor carrier:
  second capability information, used to indicate whether the terminal device supports using a preamble format 2; and
  third capability information, used to indicate whether the terminal device supports early data transmission EDT for user plane CIOT EPS optimization.

In a possible design, before the terminal device receives the first paging message from the first network device, the method further includes: The terminal device sends the second information to the first network device.

According to a seventh aspect, this application provides a data transmission method, including: A terminal device receives downlink control information DCI and a downlink message scheduled by the DCI from a first network device, where the DCI or the downlink message includes second indication information, and the second indication information is used to determine a repetition quantity of ACK/NACK feedback information. The terminal device sends the ACK/NACK feedback information to the first network device based on the repetition quantity.

In the foregoing method, the repetition quantity of the ACK/NACK feedback information is carried in the DCI or the downlink message, so that the ACK/NACK feedback information can be flexibly scheduled.

According to an eighth aspect, this application provides a data transmission method, including: A first network device sends downlink control information DCI and a downlink message scheduled by the DCI to a terminal device, where the DCI or the downlink message includes second indication information, and the second indication information is used to determine a repetition quantity of ACK/NACK feedback information. The first network device receives the ACK/NACK feedback information from the terminal device.

According to a ninth aspect, this application further provides a communication apparatus. The communication apparatus has a function of implementing the method provided in any one of the fifth aspect to the eighth aspect. The communication apparatus may be implemented by hardware, or may be implemented by hardware executing corresponding software. The hardware or the software includes one or more units or units corresponding to the foregoing function.

In a possible implementation, the communication apparatus includes a processor, and the processor is configured to support the communication apparatus in performing a corresponding function of any one of the foregoing methods. The communication apparatus may further include a memory, and the memory may be coupled to the processor, and store program instructions and data that are necessary for the communication apparatus. Optionally, the communication apparatus further includes a communication interface, and the communication interface is configured to support communication between the communication apparatus and a terminal device, a first network device, or the like.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to detailed descriptions in the method examples. Details are not described herein again.

According to a tenth aspect, an embodiment of this application provides a computer-readable storage medium, where the computer storage medium stores computer-readable instructions, and when the computer-readable instructions are executed by a computer, the computer is enabled to perform the method according to any one of the foregoing possible designs.

According to an eleventh aspect, an embodiment of this application provides a chip. The chip is connected to a memory, and is configured to read and execute a software program stored in the memory, to implement the method according to any one of the foregoing possible designs.

According to a twelfth aspect, an embodiment of this application provides a chip system. The chip system includes a processor, and may further include a memory, configured to implement the method according to any one of the foregoing possible designs. The chip system may include a chip, or may include the chip and another discrete device.

According to a thirteenth aspect, an embodiment of this application provides a computer program product. When the computer program product is read and executed by a computer, the computer is enabled to perform the method according to any one of the foregoing possible designs.

According to a fourteenth aspect, an embodiment of this application provides a system, where the system includes the terminal device provided in the second aspect, and the first network device provided in the fourth aspect.

According to a fourteenth aspect, an embodiment of this application provides a system, where the system includes the first device in the third aspect and the second device in the fourth aspect.

DESCRIPTION OF EMBODIMENTS

The following further describes in detail embodiments of this application with reference to the accompanying drawings.

The embodiments of this application may be applied to a wireless communication system, and in particular, to a mobile communication system that supports NB-IoT or eMTC, for example, a new radio (NR) system, a long term evolution system, an advanced long term evolution (LTE-A) system, an evolved long term evolution (eLTE) system, a future communication system, or another communication system. This is not limited herein.

A terminal device in the embodiments of this application may be a device that has a wireless transceiver function or a chip that can be disposed in any device, or may be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in the embodiments of this application may be a mobile phone, a pad, a computer having a wireless transceiver function, a virtual reality (VR) terminal, an augmented reality (AR) terminal, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

An access network device may be an evolved NodeB (evolutional node B, eNB) in an LTE system, may be a base transceiver station (BTS) in a global system for mobile communications (GSM) system or in a code division multiple access (CDMA) system, or may be a nodeB (NB) in a wideband code division multiple access (WCDMA) system, or the like.

Figure 1:
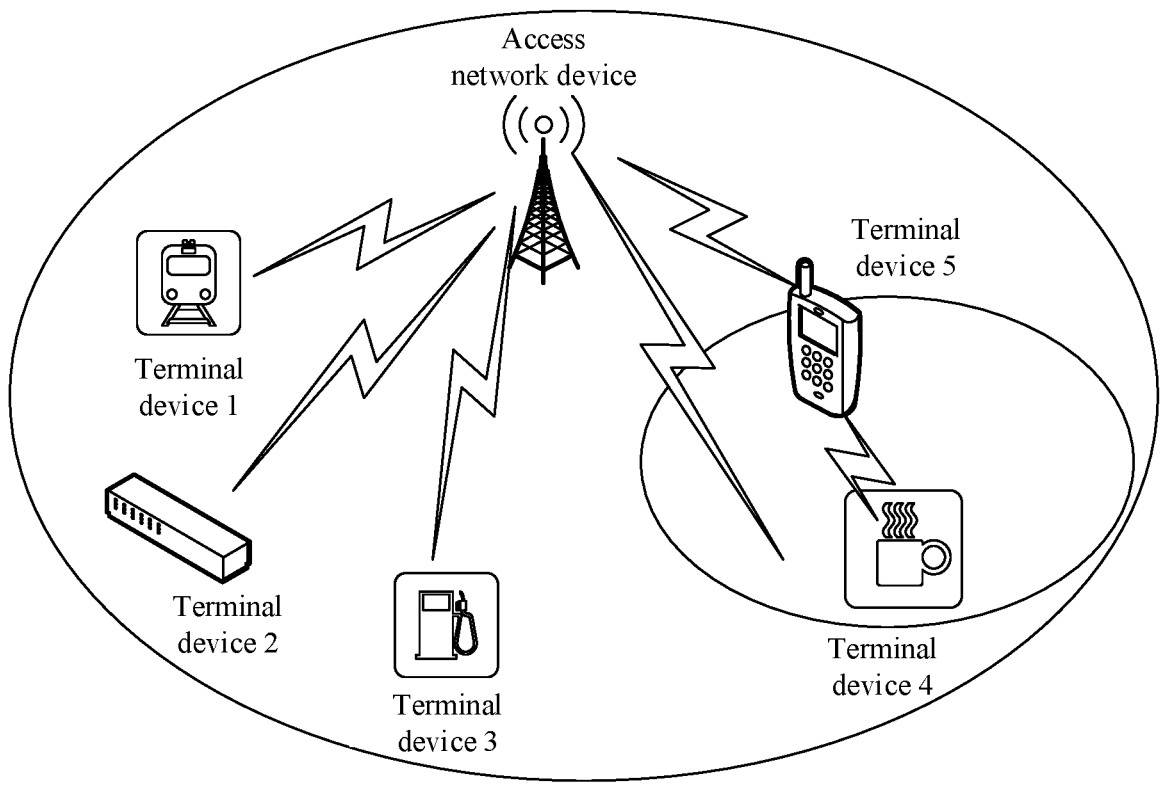
FIG. 1 is a schematic diagram of a communication system applicable to a method according to an embodiment of this application.

For ease of understanding the embodiments of this application, a communication system shown in FIG. 1 is first used as an example to describe in detail a communication system applicable to the embodiments of this application. FIG. 1 is a schematic diagram of a communication system applicable to a method according to an embodiment of this application. As shown in FIG. 1, an access network device and a terminal device 1 to a terminal device 5 form a communication system. In the communication system, the access network device sends information to one or more terminal devices in the terminal device 1 to the terminal device 5. In addition, a terminal device 4 and the terminal device 5 also form a communication system.

In the system shown in FIG. 1, the access network device may send downlink data to the terminal device by using an MT-EDT process, thereby improving data transmission efficiency. MT-EDT is a downlink data transmission scheme based on a conventional random access process. The conventional random access process generally includes the following steps.

Step 1: The terminal device sends a random access preamble to the access network device, to initiate the random access process. The random access preamble is also referred to as a message 1 (msg 1).

Step 2: The access network device sends a random access response (RAR) to the terminal device. The RAR is also referred to as a message 2 (msg 2) of the random access process.

Specifically, if the access network device successfully detects the random access preamble sent by the terminal device, the access network device sends the random access response corresponding to the random access preamble. The RAR may include information such as an uplink grant (UL grant), and the uplink grant may be used to schedule a message 3.

Step 3: The terminal device sends the message 3 to the access network device based on the uplink grant in the RAR.

Specifically, if the terminal device successfully receives the RAR in an RAR monitoring window; the terminal device transmits an EDT message 3 (msg 3) on a resource specified by the uplink grant in the RAR.

Step 4: The access network device sends a contention resolution message to the terminal device. The message may also be referred to as a message 4 (msg 4).

In the foregoing process, the terminal device enters a connected state, so that the terminal device can transmit data with the access network device. However, the foregoing process consumes a relatively long period of time and involves a relatively large quantity of signaling interactions. This increases a delay of the terminal device and increases energy consumption of the terminal device.

Figure 2:
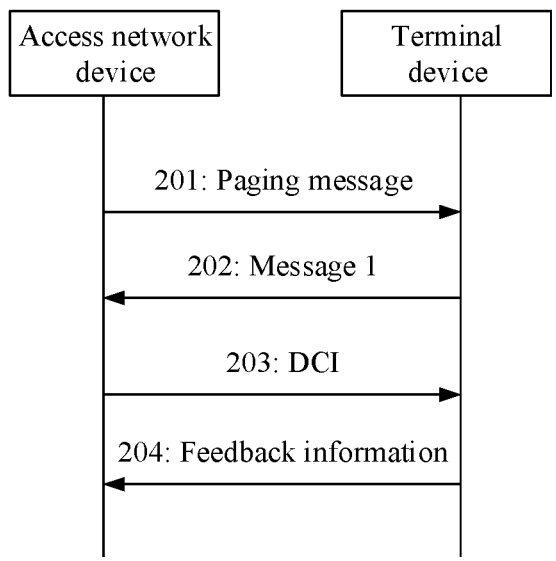
FIG. 2 is a schematic flowchart of a random access process in a conventional technology.

Therefore, for a characteristic that a time of arrival of downlink data is uncertain and a data volume of the downlink data is relatively small in an MTC system or an NB-IoT system, when the access network device needs to transmit the downlink data, the access network device can send the downlink data by using the message 2 in the MT-EDT process. Specifically, as shown in FIG. 2, an MT-EDT process that is currently discussed may include the following steps.

Step 201: An access network device sends a paging message to a terminal device.

The paging message includes information such as a radio network temporary identifier (radio network temporary identity, RNTI).

Step 202: The terminal device sends a message 1 to the access network device, where the message 1 includes a random access preamble.

Step 203: The access network device sends downlink control information (DCI) scrambled by using the RNTI to the terminal device.

The DCI is used to schedule a message 2 to be sent by the access network device.

Step 203: The access network device sends the message 2 to the terminal device, where the message 2 includes downlink data.

In a conventional technology, the message 2 does not include the downlink data, and only includes signaling such as an uplink grant (UL grant). Therefore, the terminal device does not need to send feedback information of the message 2. Because the message 2 in the MT-EDT process includes the downlink data, the terminal device further needs to send feedback information, and the access network device determines whether the terminal device receives message data sent by using the message 2. Therefore, the MT-EDT process may further include step 204.

Step 204: The terminal device sends acknowledgement (acknowledge, ACK) ACK/negative acknowledgement (NACK) feedback information of the message 2 to the access network device.

Optionally, after the terminal device successfully receives the message 2, the terminal device releases a connection to the access network device, and remains in an idle state.

Optionally, after the terminal device successfully receives the message 2, if the terminal device has uplink data, the terminal device monitors the DCI sent by the access network device. After the terminal device receives the DCI, the terminal device sends the uplink data to the access network device.

In the foregoing process, the ACK/NACK feedback information sent by the terminal device needs to be scheduled by the access network device. In the conventional technology, there is no method for scheduling the ACK/NACK feedback information in the MT-EDT process. Therefore, an embodiment of this application provides a method for scheduling the terminal device to send the ACK/NACK feedback information. The following provides detailed descriptions.

Embodiment 1

Figure 3:
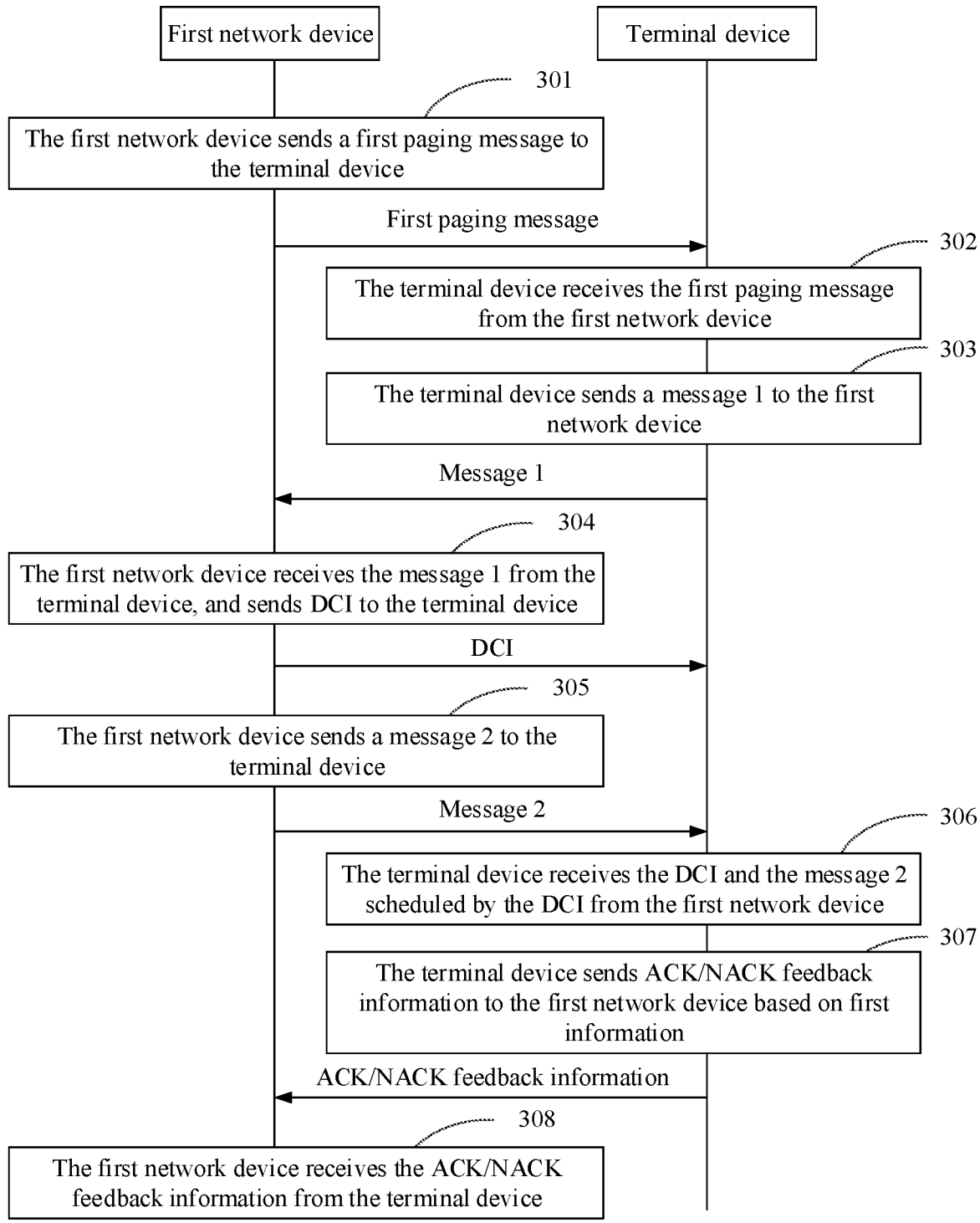
FIG. 3 is a schematic flowchart of a data transmission method according to an embodiment of this application.

In Embodiment 1, ACK/NACK feedback information may be scheduled by using DCI. Specifically, with reference to the foregoing descriptions, FIG. 3 is a schematic flowchart of a data transmission method according to an embodiment of this application. In a procedure shown in FIG. 3, a first network device may be an access network device, and a second network device may be a core network device. Refer to FIG. 3. The method includes the following steps.

Step 301: The first network device sends a first paging message to a terminal device.

The first paging message may carry information such as a first RNTI and a non-access stratum (NAS) identifier of the paged terminal device, and the NAS identifier may be an identifier such as a system architecture evolution temporary mobile station identifier (S-TMSI).

The first paging message may further include resource indication information, and the resource indication information is used to indicate a random access channel (RACH) resource and a first radio network temporary identifier (radio network temporary identity, RNTI) corresponding to the RACH resource. The first RNTI may be used to scramble DCI.

The first paging message may further include downlink data indication information, and the downlink data indication information is used to indicate downlink data that needs to be sent to the terminal device.

It should be noted that before sending the first paging message, the first network device further receives a second paging message from a second network device, and the second paging message is used to indicate the first network device to page the terminal device. The second paging message is sent after the second network device obtains the downlink data of the terminal device.

Step 302: The terminal device receives the first paging message from the first network device.

If the terminal device determines that the first paging message includes the NAS identifier of the terminal device, and the first paging message includes the first RNTI, the terminal device may send a message 1 on the RACH resource, namely, step 303.

Step 303: The terminal device sends the message 1 to the first network device, where the message 1 includes a random access preamble.

Step 304: The first network device receives the message 1 from the terminal device, and sends DCI to the terminal device.

The shown DCI may be scrambled by using the first RNTI.

The DCI may be used to schedule the message 2. For details about how the DCI schedules the message 2, refer to descriptions in a conventional technology. Details are not described herein.

Further, the DCI may include first information, and the first information is used to schedule ACK/NACK feedback information of the message 2. There may be a plurality of implementations of the first information, which are separately described below.

In a first possible implementation, the first information includes first indication information, but does not include second indication information, where a repetition quantity of the ACK/NACK feedback information indicated by the second indication information is indicated by a system message or is set.

The first indication information is used to determine a subcarrier spacing of subcarriers for transmitting the ACK/NACK feedback information; and the second indication information is used to determine the repetition quantity of the ACK/NACK feedback information.

In this implementation, the DCI may include a first field used to transmit the first indication information, the first indication information is a status value of a bit included in the first field, and different status values of the bit included in the first field are used to indicate different subcarrier spacings.

For example, the first field includes 1 bit, and when the status value of the bit included in the first field is '0', it indicates that an uplink subcarrier spacing is 3.75 kHz; and when the status value of the bit included in the first field is '1', it indicates that the uplink subcarrier spacing is 15 KHz.

In this implementation, for content included in the DCI, refer to Table 1.

TABLE 1

| Fields included in the DCI | Bit width |
|---|---|
| Flag for format N0/format N1 differentiation or narrowband physical downlink control channel (narrow physical downlink control channel, NPDCCH) order (order) indicator | 1 |
| First field | 1 |
| Scheduling delay | 3 |
| Resource allocation | 3 |
| Modulation and coding scheme | 4 |
| Repetition quantity | 4 |
| New data indicator | 1 |
| HARQ-ACK resource | 4 |
| Repetition quantity of the DCI | 2 |

In Table 1, the flag for format N0/format N1 differentiation field is used to indicate a specific format of the DCI. The NPDCCH order indicator field is used to indicate whether current DCI scheduling is a random access process initiated by an NPDCCH order. The scheduling delay field is used to determine a start time of transmitting a message scheduled by DCI. The resource allocation field is used to indicate resource allocation of the message scheduled by the DCI, for example, allocation of a time domain resource. The modulation and coding scheme field is used to indicate a modulation order of the message scheduled by the DCI. The repetition quantity field is used to indicate a repetition quantity used for transmission of the message scheduled by the DCI. The new data indicator field is used to indicate whether currently scheduled transmission is new transmission or retransmission. The HARQ-ACK resource field is used to indicate a time-frequency resource location for transmitting the ACK/NACK feedback information. The repetition quantity of the DCI field is used to indicate a repetition quantity of the DCI.

When a format of the DCI is a DCI format N1, a bit occupied by the first field may be a bit occupied by the flag for format N0/format N1 differentiation field in the original DCI format N1, or a bit occupied by the NPDCCH order indicator field. In this case, the DCI includes only one field in the flag for format N0/format N1 differentiation field and the NPDCCH order indicator field, shown in Table 1. In this method, scheduling is more flexible. Compared with an existing DCI format, in the DCI format N1, a quantity of DCI bits is not increased. This can ensure DCI demodulation performance and does not increase complexity of demodulation and decoding of the DCI by the terminal device.

When the format of the DCI is a newly defined DCI format, namely, a format other than the DCI format N0 and the DCI format N1, the DCI may include both the flag for format N0/format N1 differentiation field and the NPDCCH order indicator field, and further includes the first field. To be specific, on the basis of all fields included in the existing DCI format N1, one first field is added. For details, refer to Table 2.

TABLE 2

| Fields included in the DCI | Bit width |
|---|---|
| Flag for format N0 or format N1 differentiation | 1 |
| NPDCCH order indicator | 1 |
| First field | 1 |
| Scheduling delay | 3 |
| Resource allocation | 3 |

TABLE 2-continued

| Fields included in the DCI | Bit width |
|---|---|
| Modulation and coding scheme | 4 |
| Repetition quantity | 4 |
| New data indicator | 1 |
| HARQ-ACK resource | 4 |
| Repetition quantity of the DCI | 2 |

In a second possible implementation, the first information includes second indication information, but does not include first indication information, and a subcarrier spacing indicated by the first indication information is indicated by a system message or is set.

In this implementation, the DCI may include a second field used to transmit the second indication information, the second indication information is a status value of a bit included in the second field, and different status values of the bit included in the second field are used to indicate different repetition quantities of the ACK/NACK feedback information.

For example, the second field includes 1 bit, and when the status value of the bit included in the second field is '0', it indicates that the repetition quantity of the ACK/NACK feedback information is 2; and when the status value of the bit included in the first field is '1', it indicates that the repetition quantity of the ACK/NACK feedback information is 4.

In this implementation, the DCI may include a second field used to transmit the second indication information. One status value of different status values of a bit included in the second field indicates that the repetition quantity of the ACK/NACK feedback information is the same as a repetition quantity of the ACK/NACK feedback information indicated in the system message. For example, when the repetition quantity of the ACK/NACK feedback information indicated in the system message is 4, the second field includes 1 bit, and the status value of the bit included in the second field is '0', it indicates that the repetition quantity of the ACK/NACK feedback information is the same as the repetition quantity of the ACK/NACK feedback information indicated in the system message. That is, the repetition quantity of the ACK/NACK feedback information is 4. When the status value of the bit included in the first field is '1', it indicates that the repetition quantity of the ACK/NACK feedback information is 2.

In this implementation, when the format of the DCI is the DCI format N1, for content included in the DCI, refer to Table 3.

TABLE 3

| Fields included in the DCI | Bit width |
|---|---|
| Flag for format N0 or format N1 differentiation or NPDCCH order indicator | 1 |
| Second field | 1 |
| Scheduling delay | 3 |
| Resource allocation | 3 |
| Modulation and coding scheme | 4 |
| Repetition quantity | 4 |
| New data indicator | 1 |
| HARQ-ACK resource | 4 |
| Repetition quantity of the DCI | 2 |

In Table 3, for meanings of the flag for format N0/format N1 differentiation field, the NPDCCH order indicator field, the scheduling delay field, the resource allocation field, the modulation and coding scheme field, the repetition quantity field, the new data indicator field, the HARQ-ACK resource field, and the repetition quantity of the DCI field, refer to the foregoing descriptions. Details are not described herein again.

When a format of the DCI is the DCI format N1, the bit occupied by the second field may be a bit occupied by the flag for format N0/format N1 differentiation field in the original DCI format N1, or a bit occupied by the NPDCCH order indicator field. In this case, the DCI includes only one field in the flag for format N0/format N1 differentiation field and the NPDCCH order indicator field. In this method, scheduling is more flexible. Compared with an existing DCI format, in the DCI format N1, a quantity of DCI bits is not increased. This can ensure DCI demodulation performance and does not increase complexity of demodulation and decoding of the DCI by the terminal device.

In this implementation, when the format of the DCI is a newly defined DCI format, namely, a format other than the DCI format N0 and the DCI format N1, a quantity of bits included in the second field may be greater than or equal to 1, for example, 1, 2, or 3. In this implementation, the DCI may include both the flag for format N0/format N1 differentiation field and the NPDCCH order indicator field, or may include one of the both fields. For details, refer to Table 4.

TABLE 4

| Fields included in the DCI | Bit width |
| --- | --- |
| Flag for format N0 or format N1 differentiation | 1 or 0 |
| NPDCCH order indicator | 1 or 0 |
| Second field | 1, 2, or 3 |
| Scheduling delay | 3 |
| Resource allocation | 3 |
| Modulation and coding scheme | 4 |
| Repetition quantity | 4 |
| New data indicator | 1 |
| HARQ-ACK resource | 4 |
| Repetition quantity of the DCI | 2 |

In Table 4, when the bit width of the flag for format N0 or format N1 differentiation field is 0, it indicates that the DCI does not include the field, and when the bit width of the flag for format N0 or format N1 differentiation field is 1, it indicates that the DCI includes the field. Correspondingly, when the bit width of the NPDCCH order indicator field is 0, it indicates that the DCI does not include the field, and when the bit width of the NPDCCH order indicator field is 1, it indicates that the DCI includes the field.

Based on a current power control mechanism of the ACK/NACK feedback information, when the repetition quantity of the ACK/NACK feedback information is greater than 2, the ACK/NACK feedback information is transmitted at full power. If an initial system message or RRC signaling indicates that the repetition quantity of the ACK/NACK feedback information is greater than 2, when the terminal device is relatively close to the first network device, full power transmission causes relatively strong uplink interference, affecting an uplink service of another terminal device. Consequently, an uplink system throughput is affected.

If the repetition quantity of the ACK/NACK feedback information is indicated by using the system message or RRC signaling, the terminal device needs to re-obtain the system message or receive RRC reconfiguration information to obtain an updated parameter. This increases power consumption of the terminal device. However, in this embodiment of this application, the repetition quantity of the ACK/NACK feedback information is indicated herein by using the DCI. This is relatively more flexible, and can avoid uplink interference caused by full power transmission of the ACK/NACK feedback information.

In a third embodiment of this application, the first information includes first indication information and second indication information.

In this implementation, the DCI may include a first field used to transmit the first indication information and a second field used to transmit the second indication information. For the first field and the second field, refer to the foregoing descriptions. Details are not described herein again.

For example, in this implementation, when a format of the DCI is the DCI format N1, for content included in the DCI, refer to Table 3.

TABLE 5

| Fields included in the DCI | Bit width |
| --- | --- |
| Flag for format N0 or format N1 differentiation | 0 or 1 |
| NPDCCH order indicator | 0 or 1 |
| First field | 1 |
| Second field | 1, 2, or 3 |
| Scheduling delay | 3 |
| Resource allocation | 3 |
| Modulation and coding scheme | 4 |
| Repetition quantity | 4 |
| New data indicator | 1 |
| HARQ-ACK resource | 4 |
| Repetition quantity of the DCI | 2 |

In Table 5, when the bit width of the flag for format N0 or format N1 differentiation field is 0, it indicates that the DCI does not include the field, and when the bit width of the flag for format N0 or format N1 differentiation field is 1, it indicates that the DCI includes the field. Correspondingly, when the bit width of the NPDCCH order indicator field is 0, it indicates that the DCI does not include the field, and when the bit width of the NPDCCH order indicator field is 1, it indicates that the DCI includes the field.

In this implementation, both the repetition quantity of the ACK/NACK feedback information and the subcarrier spacing of the ACK/NACK feedback information may be indicated by using the DCI, thereby further improving scheduling flexibility.

Step 305: The first network device sends the message 2 to the terminal device.

The message 2 includes the downlink data, and may further include signaling sent to the terminal device.

Step 306: The terminal device receives the DCI and the message 2 scheduled by the DCI from the first network device.

Step 307: The terminal device sends the ACK/NACK feedback information to the first network device based on the first information.

Step 308: The first network device receives the ACK/NACK feedback information from the terminal device.

Specifically, the terminal device may determine the time-frequency resource of the ACK/NACK feedback information based on the DCI, and determine, based on the first information, at least one of the subcarrier spacing and the repetition quantity that are of the ACK/NACK feedback information. If only the subcarrier spacing of the ACK/NACK feedback information is determined based on the first information, the repetition quantity of the ACK/NACK feedback information may be determined by using a system message, or the repetition quantity of the ACK/NACK feedback information is preset. If only the repetition quantity of the ACK/NACK feedback information is determined based on the first information, the subcarrier spacing of the ACK/NACK feedback information may be determined by using a system message, or the subcarrier spacing of the ACK/NACK feedback information is preset. The terminal device may send the ACK/NACK feedback information based on the time-frequency resource, the subcarrier spacing, and the repetition quantity.

It should be noted that in this embodiment of this application, there are the following manners in which the terminal device sends the ACK/NACK feedback information of the message 2 to the first network device:

Manner 1: If the terminal device correctly receives the message 2, the ACK/NACK feedback information is an ACK, and the terminal device sends the ACK to the first network device. If the terminal device does not correctly receive the message 2, the ACK/NACK feedback information is a NACK, and the terminal device sends the NACK to the first network device.

Manner 2: If the terminal device correctly receives the message 2, the ACK/NACK feedback information is an ACK, and the terminal device sends the ACK to the first network device. If the terminal device does not correctly receive the message 2, the terminal device does not perform a sending operation, that is, the terminal device does not send a NACK to the first network device.

Manner 3: If the terminal device correctly receives the message 2, the ACK/NACK feedback information is an ACK, and the terminal device does not perform a sending operation. This may be understood that the terminal device does not send the ACK to the first network device. If the terminal device does not correctly receive the message 2, the ACK/NACK feedback information is a NACK, and the terminal device sends the NACK to the first network device.

Optionally, when sending the ACK/NACK feedback information of the message 2 to the first network device, the terminal device can send a scheduling request at the same time. The scheduling request is used to request the first network device to allocate an uplink channel resource. For example, when there is the scheduling request, the terminal device may determine a complex symbol sequence based on a first sequence and a modulation symbol of the ACK/NACK feedback information. The complex symbol sequence is obtained by multiplying the modulation symbol of the ACK/NACK feedback information by all elements of the first sequence, and the terminal device transmits the complex symbol sequence at an ACK/NACK resource location. Correspondingly, the first network device receives the complex symbol sequence, detects the first sequence, and determines that the terminal device sends the scheduling request.

Optionally, when the terminal device sends the ACK/NACK feedback information of the message 2 to the first network device, the terminal device may simultaneously send a buffer status report (BSR) or a data volume. The buffer status report or the data volume is used to provide the first network device with information about a volume of data available for transmission in an uplink buffer. For example, when a data volume corresponding to the BSR is a first data volume, the terminal device may determine the complex symbol sequence based on the first sequence and the modulation symbol of the ACK/NACK feedback information. The complex symbol sequence is obtained by multiplying the modulation symbol of the ACK/NACK feedback information by all the elements of the first sequence, and the terminal device transmits the complex symbol sequence at the ACK/NACK resource location. Correspondingly, the first network device receives the complex symbol sequence, detects the first sequence, and determines that a data volume of the terminal device is the first data volume. Similarly, different sequences may be used to correspond to different data volumes.

Embodiment 2

In this embodiment of this application, in addition to that the ACK/NACK feedback information is scheduled by using the DCI, the ACK/NACK feedback information may also be scheduled by using the message 2. Specifically, with reference to the procedure shown in FIG. 3, if the ACK/NACK feedback information is scheduled by using the message 2, in step 304, the DCI sent by the first network device to the terminal device does not include the first information. Correspondingly, in step 305, the message 2 sent by the first network device to the terminal device includes the first information. Other steps in Embodiment 2 may be the same as those in Embodiment 1. For details, refer to the descriptions in Embodiment 1, and details are not described herein again.

The first information included in the message 2 is used to schedule the ACK/NACK feedback information of the message 2. There may be a plurality of implementations of the first information, which are separately described below:

In a first possible implementation, the first information includes first indication information, but does not include second indication information, where a repetition quantity of the ACK/NACK feedback information indicated by the second indication information is indicated by a system message or is set.

In a second possible implementation, the first information includes second indication information, but does not include first indication information, where a subcarrier spacing of the ACK/NACK feedback information indicated by the first indication information is indicated by a system message or is set.

In a third embodiment of this application, the first information includes first indication information and second indication information.

For example, because the message 2 includes a relatively large quantity of bits, more pieces of information may be carried. Therefore, when the message 2 includes the first information, the first information may further include one or more of the following: third indication information, fourth indication information, fifth indication information, sixth indication information, and seventh indication information.

The third indication information is used to determine a location of a subcarrier for transmitting the ACK/NACK feedback information, where the location of the subcarrier is used to indicate a frequency domain resource location of the ACK/NACK feedback information, and the frequency domain resource location indicates a specific subcarrier used to transmit the ACK/NACK feedback information. For example, it is assumed that the subcarrier spacing of the ACK/NACK feedback information is 15 kHz, there are 12 subcarriers in total in a bandwidth of 180 kHz, a value set of indexes of the subcarriers is 0 to 11, and the third indication information may be an index of a subcarrier. When the third indication information is 1, it indicates that the location of the subcarrier is a location corresponding to the subcarrier whose index is 2.

The fourth indication information is used to determine a scheduling delay of the ACK/NACK feedback information, and the scheduling delay is duration from the end of transmission of the message 2 to the start of transmission of the ACK/NACK feedback information.

The fifth indication information is used to determine target receive power of the ACK/NACK feedback information, and the terminal device may determine, based on the target receive power, transmit power for sending the ACK/NACK feedback information.

The sixth indication information is used to determine a path loss compensation factor for transmitting the ACK/NACK feedback information.

The seventh indication information is used to determine a timing advance for transmitting the ACK/NACK feedback information.

In an example, the terminal device may determine, based on the fifth indication information and/or the sixth indication information, the transmit power for sending the ACK/NACK feedback information. For example, the target receive power of the ACK/NACK feedback information determined based on the fifth indication information is p0, the path loss compensation factor of the ACK/NACK feedback information is $\alpha$, and $\alpha$ is determined based on the sixth indication information or is indicated by using a system message or is preset. Transmit power p of the ACK/NACK feedback information is equal to min $\{p_{max}, 10 \log 10 (M)+p0+\alpha \cdot PL\}$, where $p_{max}$ is maximum transmit power configured by the first network device for the terminal device, M is a preset value related to the subcarrier spacing of the ACK/NACK feedback information, and PL is a downlink path loss estimated by the terminal device.

It should be noted that, in this embodiment of this application, when the message 2 includes the first information, the first information may be carried by using a medium access control (MAC) control element (CE) or a MAC protocol data unit (PDU) in the message 2, and may be multiplexed into the message 2 together with downlink data.

Embodiment 3

In this embodiment of this application, the ACK/NACK feedback information may be scheduled by jointly using DCI and a message 2. In this implementation, the first information includes a first part and a second part. With reference to the procedure shown in FIG. 3, in step 304, the DCI sent by the first network device to the terminal device includes the first part. Correspondingly, in step 305, the message 2 sent by the first network device to the terminal device includes the second part. Other steps in Embodiment 3 may be the same as those in Embodiment 1. For details, refer to the descriptions in Embodiment 1, and details are not described herein again.

In a first possible implementation, indication information included in each of the first part and the second part is complete indication information, that is, all bits of one piece of indication information are included in the first part or included in the second part.

For example, the first part may include first indication information, and the second part may include second indication information.

For another example, the first part may include the second indication information, and the second part includes the first indication information.

For example, the second part may further include one or more of third indication information, fourth indication information, fifth indication information, sixth indication information, and seventh indication information.

In a second embodiment, the first part and the second part may be combined to include first indication information, or the first part and the second part may be combined to include second indication information.

In this implementation, bits included in the first indication information may be divided into a first sub-part and a second sub-part, and the first part includes the first sub-part, and the second part includes the second sub-part. Correspondingly, bits included in the second indication information may be divided into a third sub-part and a fourth sub-part. The first part includes the third sub-part, and the second part includes the fourth sub-part.

For example, the second indication information indicates a repetition quantity of the ACK/NACK feedback information by using 3 bits. The 3 bits may be divided into the first sub-part and the second sub-part, where the first sub-part is 1 most significant bit, and the second sub-part is 2 remaining bits. The DCI includes the first sub-part, and the message 2 includes the second sub-part. To be specific, in the DCI, 1 bit is used to indicate a most significant bit of the repetition quantity of the ACK/NACK feedback information; and in the message 2, 2 bits are used to indicate 2 lower bits of the repetition quantity of the ACK/NACK feedback information.

Certainly, the foregoing is merely an example. When the second indication information indicates the repetition quantity of the ACK/NACK feedback information by using X+Y bits, the DCI may also include X lowest significant bits of the repetition quantity of the ACK/NACK feedback information, and the message 2 may include remaining most significant Y bits of the repetition quantity of the ACK/NACK feedback information, where both X and Y are integers greater than 0.

The foregoing example is also applicable to the case of the first indication information. How to jointly indicate the first indication information may be deduced based on the foregoing example. Details are not described herein again.

For the first indication information to the seventh indication information in this embodiment, refer to the descriptions in Embodiment 1 and Embodiment 2. Details are not described herein again.

In the foregoing embodiment, how to schedule the ACK/NACK feedback information of the message 2 is described. In the procedure in FIG. 3, in step 301, the first paging message sent by the first network device to the terminal device includes resource indication information used to indicate an RACH resource. In a conventional technology, when the first network device allocates a RACH resource, the first network device performs allocation based on a method agreed in a standard, but an allocated RACH resource may not match a capability of the terminal device. Therefore, an embodiment of this application further provides a resource allocation method to resolve the foregoing problem, which is described in detail below.

It should be noted that Embodiment 4 may be combined with any one of Embodiments 1 to 3, or may be implemented as an independent solution. This is not limited in the embodiments of this application.

Embodiment 4

Figure 4:
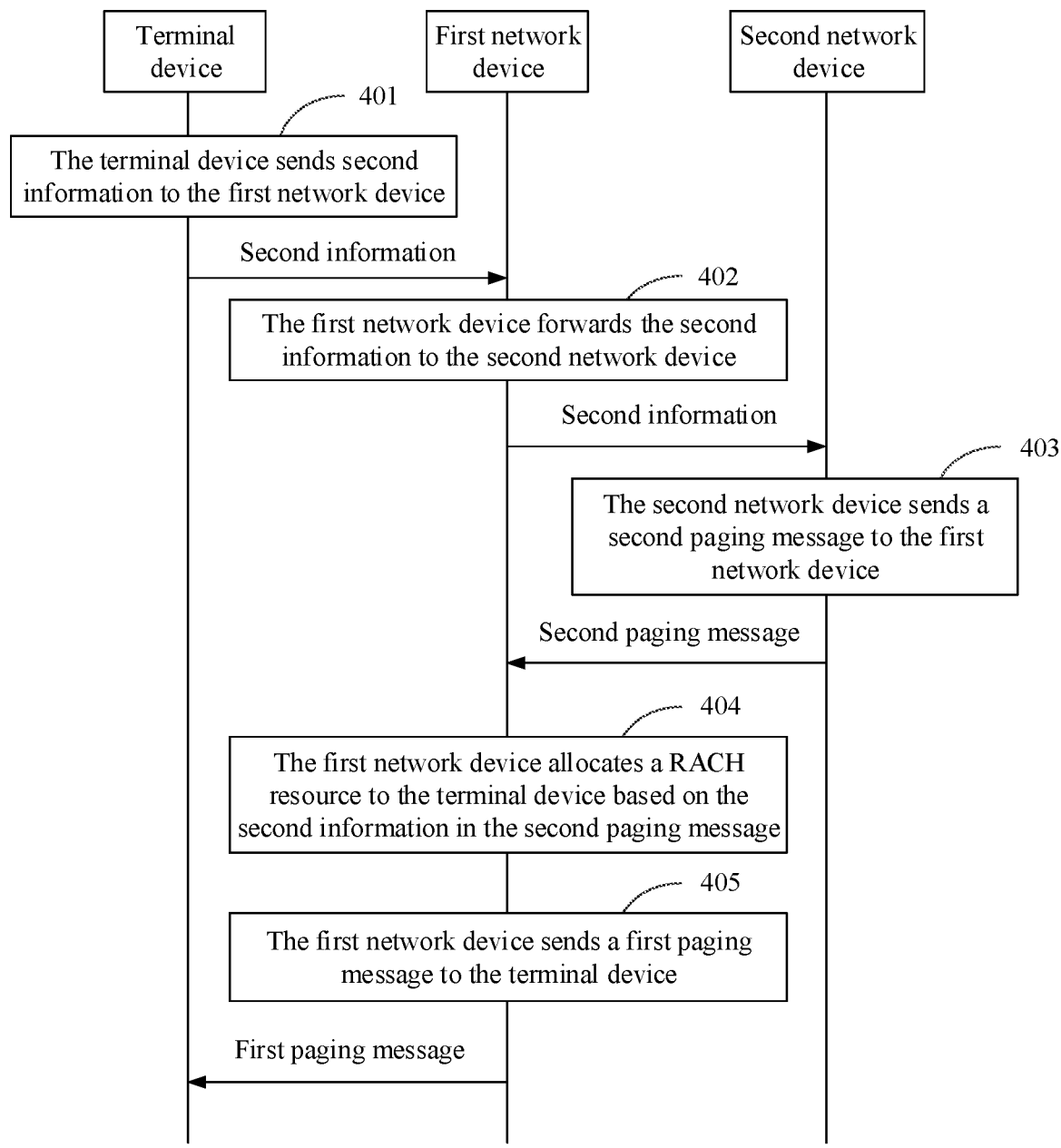
FIG. 4 is a schematic flowchart of a data transmission method according to an embodiment of this application.

FIG. 4 is a schematic flowchart of a data transmission method according to an embodiment of this application. In a procedure shown in FIG. 4, a first network device may be an access network device, and a second network device may be a core network device. Refer to FIG. 4. The method includes the following steps.

Step 401: A terminal device sends second information to the first network device.

The second information includes paging-related capability information possessed by the terminal device. Alternatively, the second information includes capability information that is possessed by the terminal device and that is required for paging. For example, the second information may include one or more of the following:

first capability information, used to indicate whether the terminal device supports initiating random access on a non-anchor carrier;

second capability information, used to indicate whether the terminal device supports using the preamble format 2; and third capability information, used to indicate whether the terminal device supports EDT for user plane cellular internet of things (CIOT) evolved packet system (EPS) optimization.

With reference to the foregoing capability information, for example, in early data transmission for user plane CIOT EPS optimization, uplink data is carried by using an RRC connection resume request (RRCConnectionResumeRequest) message. The early data transmission for the CIOT EPS optimizations and a common random access process are distinguished by using different random access resources. The early data transmission for the CIOT EPS optimization corresponds to a first random access resource, and the common random access process corresponds to a second random access resource. The terminal device initiates a data early transmission process for the CIOT EPS optimization by using the first random access resource, and the terminal device initiates the common random access process by using the second random access resource.

For example, the second information may include one or more of the following:

fourth capability information, used to indicate whether the terminal device supports a hybrid deployment mode in multi-carrier deployment; and fifth capability information, used to indicate a terminal device type, and the terminal device type may be a type such as NB1 or NB2.

Step 402: The first network device forwards the second information to the second network device.

After the foregoing process is completed, when the second network device determines that downlink data needs to be sent to the terminal device, the method may further include the following steps.

Step 403: The second network device sends a second paging message to the first network device.

The second paging message includes the second information. The second paging message may further include other information. For details, refer to descriptions in a conventional technology. Details are not described herein.

Step 404: The first network device receives the second paging message from the second network device, and allocates a RACH resource to the terminal device based on the second information in the second paging message.

For example, the second information includes the first capability information, and when the first capability information indicates that the terminal device supports initiating random access on the non-anchor carrier, the first network device may allocate a RACH resource located on the non-anchor carrier to the terminal device. The second information includes the second capability information, and when the second capability information indicates that the terminal device supports using the preamble format 2, the first network device may allocate a RACH resource corresponding to the preamble format 2 to the terminal device. The second information includes the third capability information, and the third capability information indicates, for the user plane CIOT EPS optimization, when the terminal device supports EDT, the first network device may allocate a RACH resource corresponding to the EDT to the terminal device. For the foregoing several cases, the first network device may further allocate a RACH resource located on an anchor carrier to the terminal device.

When the second information does not include the first capability information, the second capability information, and the third capability information, the first network device may allocate the RACH resource located on the anchor carrier to the terminal device.

For definitions of the anchor carrier and the non-anchor carrier, for example, in an NB-IoT system, for frequency division duplex (FDD), the anchor carrier means a carrier where the terminal device assumes that a narrowband primary synchronization signal (NPSS)/a narrowband secondary synchronization signal (NSSS)/a narrowband physical broadcast channel (NPBCH)/a narrowband system information block (system information block-NB, SIB-NB) is transmitted. For a time division duplex (TDD), the anchor carrier is the carrier where the terminal device assumes that NPSS/NSSS/NPBCH is transmitted.

In the NB-IoT system, for FDD, the non-anchor carrier indicates a carrier where the terminal device assumes that no NPSS/NSSS/NPBCH/SIB-NB is transmitted. For TDD, the non-anchor carrier indicates a carrier where the terminal device assumes that no NPSS/NSSS/NPBCH is transmitted.

For a definition of the preamble format 2, for example, in the NB-IoT system, the preamble format 2 is a new preamble format introduced in Rel-15, to support a larger cell radius, where the cell radius is greater than 100 km. The preamble format 2 includes six symbol groups in time domain. Each symbol group includes one cyclic prefix (CP) and three symbols. A length of the CP is 800 µs, and a length of each symbol is also 800 µs. A subcarrier spacing of the preamble format 2 is 1.25 kHz.

Step 405: The first network device determines, based on the second paging message, a first paging message to be sent to the terminal device, and sends the first paging message to the terminal device.

The first paging message includes resource indication information, and the resource indication information is used to indicate the RACH resource.

In the foregoing solution, the first network device allocates the RACH resource based on the second information of the terminal device, so that a RACH resource matching a capability of the terminal device can be allocated, thereby improving resource utilization efficiency.

The foregoing embodiments are described for a downlink data transmission scenario in MT-EDT. An embodiment of this application further provides a method, which may be applicable to a common downlink data transmission scenario. The common downlink data transmission scenario may mean that when the terminal device is in an RRC connected state, the terminal device performs downlink data transmission with the first network device.

Embodiment 5

Step 1: A first network device sends DCI to a terminal device.

A format of the DCI may be DCI format N1. The DCI is used to schedule a downlink message.

In a possible implementation, the DCI may include second indication information, where the second indication information is used to determine a repetition quantity of ACK/NACK feedback information.

When the DCI includes the repetition quantity of the ACK/NACK feedback information of the downlink message, for a specific implementation, refer to the implementation in which the DCI includes the second indication information in the procedure shown in FIG. 3. Details are not described herein again.

Step 2: The first network device sends the downlink message scheduled by the DCI to the terminal device.

In a possible implementation, when the DCI does not include the second indication information, the downlink message may include the second indication information.

Step 3: The terminal device receives the DCI and the downlink message scheduled by the DCI from the first network device.

The downlink message includes downlink data that needs to be transmitted to the terminal device.

Step 4: The terminal device sends the ACK/NACK feedback information to the first network device based on the repetition quantity.

Step 5: The first network device receives the ACK/NACK feedback information from the terminal device.

In the foregoing method, the repetition quantity of the ACK/NACK feedback information of the downlink message is carried in the DCI or the downlink message, so that the repetition quantity of the ACK/NACK feedback information is flexibly adjusted, power control of the ACK/NACK feedback information is improved, and uplink interference to another terminal device is avoided when the ACK/NACK feedback information is transmitted at full power.

It should be noted that when the downlink message includes first information, the first information may be indicated by using a MAC CE or MAC PDU in the downlink message, and may be multiplexed into the downlink message together with the downlink data.

Optionally, in a possible implementation, when the DCI includes second indication information, the downlink message may further include at least one of first indication information, and third indication information to seventh indication information. For specific content of the first indication information, and the third indication information to the seventh indication information, refer to the descriptions in Embodiment 1 to Embodiment 3. Details are not described herein again.

Optionally, in a possible implementation, when the DCI includes the second indication information, and the downlink message does not include the first indication information used to determine a subcarrier spacing of subcarriers of the ACK/NACK feedback information, the DCI may include the first indication information. When the DCI includes the first indication information and the second indication information, for a specific implementation, refer to the implementation in which the DCI includes the first indication information and the second indication information in the procedure shown in FIG. 3. Details are not described herein again.

Optionally, in a possible implementation, the DCI and the downlink message may be combined to include the first indication information, and the DCI and the downlink message may alternatively be combined to include the second indication information.

When the DCI and the downlink message may be combined to include the first indication information, bits included in the first indication information may be divided into a first sub-part and a second sub-part, and the DCI includes the first sub-part, and the downlink message includes the second sub-part. Correspondingly, when the DCI and the downlink message may be combined to include the second indication information, bits included in the second indication information may be divided into a third sub-part and a fourth sub-part. The DCI includes the third sub-part, and the downlink message includes the fourth sub-part.

For example, the second indication information indicates the repetition quantity of the ACK/NACK feedback information by using 3 bits. The 3 bits may be divided into the first sub-part and the second sub-part, where the first sub-part is 1 most significant bit, and the second sub-part is 2 remaining bits. The DCI includes the first sub-part, and the downlink message includes the second sub-part. To be specific, in the DCI, 1 bit is used to indicate a most significant bit of the repetition quantity of the ACK/NACK feedback information; and in the downlink message, 2 bits are used to indicate 2 lower bits of the repetition quantity of the ACK/NACK feedback information.

For Embodiment 1 to Embodiment 5, a format of the DCI used to schedule the message 2 or the downlink message may be format N1. The DCI may be monitored by the terminal device in a Type-2 common search space Type-2 CSS (common search space). Correspondingly, the first network device sends the DCI to the terminal device in the Type-2 CSS, to schedule the message 2 or the downlink message.

For Embodiment 2 to Embodiment 5, for a specific manner in which the terminal device sends the ACK/NACK feedback information of the message 2 to the first network device, refer to the descriptions in Embodiment 1.

In the foregoing embodiments provided in this application, the method provided in the embodiments of this application is separately described from a perspective of interaction between devices. To implement functions in the method provided in the embodiments of this application, the terminal device and the first network device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 5:
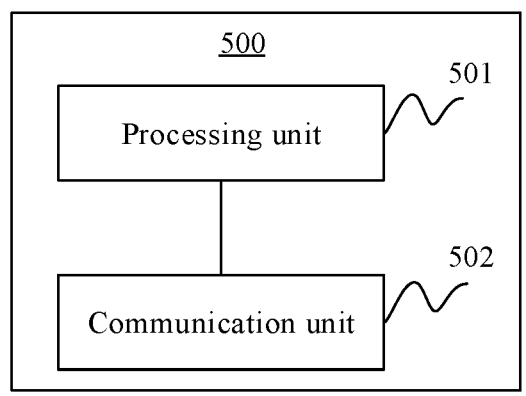
FIG. 5 is a schematic diagram of a structure of a communication apparatus according to an embodiment of this application.

Same as the foregoing concept, as shown in FIG. 5, an embodiment of this application further provides an apparatus 500, configured to implement a function of the terminal device or the first network device in the foregoing method. For example, the apparatus may be a software module or a chip system. In this embodiment of this application, the chip system may include a chip, or may include the chip and another discrete device. The apparatus 500 may include a processing unit 501 and a communication unit 502.

In this embodiment of this application, division into the modules is an example, and is merely a logical function division. During actual implementation, another division manner may be used. In addition, functional modules in the embodiments of this application may be integrated into one processor, or each of the modules may exist alone physically, or two or more modules are integrated into one module. The integrated module may be implemented in a form of hardware, or may be implemented in a form of a software functional module.

For example, when the apparatus 500 implements a function of the terminal device in the procedure shown in FIG. 3 or 4, the communication unit 502 is, configured to: send a message 1 to the first network device, where the message 1 includes a random access preamble: receive downlink control information DCI and a message 2 scheduled by the DCI from the first network device, where the message 2 includes downlink data, the DCI and/or the message 2 include/includes first information, and the first information is used to schedule acknowledgement ACK/negative acknowledgement NACK feedback information of the message 2;

the processing unit 501 is configured to determine the ACK/NACK feedback information; and the communication unit 502 is further configured to send the ACK/NACK feedback information to the first network device based on the first information.

In a possible design, the processing unit 501 is specifically configured to:

determine a time-frequency resource, a subcarrier spacing, and a repetition quantity of the ACK/NACK feedback information; and the communication unit 502 is specifically configured to send the ACK/NACK feedback information based on the time-frequency resource, the subcarrier spacing, and the repetition quantity, where the DCI or the message 2 includes the first information, and the first information includes one or more of the following:

first indication information, where the first indication information is used to determine a subcarrier spacing of subcarriers for transmitting the ACK/NACK feedback information; and second indication information, where the second indication information is used to determine the repetition quantity of the ACK/NACK feedback information.

In a possible design, the DCI includes time-frequency resource information of the ACK/NACK feedback information, and when the first information includes only the first indication information, the repetition quantity of the ACK/NACK feedback information is indicated by a system message or is set: or when the first information includes only the second indication information, the subcarrier spacing of the subcarriers for transmitting the ACK/NACK feedback information is indicated by a system message or is set.

In a possible design, when the DCI includes the first information, the DCI includes at least one of a first field used to transmit the first indication information and a second field used to transmit the second indication information; and the first indication information is a status value of a bit included in the first field, and the second indication information is a status value of a bit included in the second field:

different status values of the bit included in the first field are used to indicate different subcarrier spacings; and different status values of the bit included in the second field are used to indicate different repetition quantities.

In a possible design, when the message 2 includes the first information, the first information further includes one or more of the following: third indication information, where the third indication information is used to determine a location of the subcarrier for transmitting the ACK/NACK feedback information: fourth indication information, where the fourth indication information is used to determine a scheduling delay of the ACK/NACK feedback information: fifth indication information, where the fifth indication information is used to determine target receive power of the ACK/NACK feedback information: sixth indication information, where the sixth indication information is used to determine a path loss compensation factor for transmitting the ACK/NACK feedback information; and seventh indication information, where the seventh indication information is used to determine a timing advance for transmitting the ACK/NACK feedback information.

In a possible design, the DCI and the message 2 include the first information, where the first information includes first indication information and second indication information, the DCI includes the first indication information, and the message 2 includes the second indication information: or the DCI includes the second indication information, and the message 2 includes the first indication information: the first indication information is used to determine a subcarrier spacing of subcarriers for transmitting the ACK/NACK feedback information; and the second indication information is used to determine a repetition quantity of the ACK/NACK feedback information.

In a possible design, before the communication unit 502 sends the message 1 to the first network device, the communication unit 502 is further configured to:

receive a first paging message from the first network device, where the first paging message includes resource indication information, the resource indication information is used to indicate a random access channel RACH resource allocated to the terminal device, and the RACH resource is used to carry the message 1; and the RACH resource is allocated based on second information, and the second information includes paging-related capability information possessed by the terminal device.

In a possible design, the second information includes one or more of the following:

first capability information, used to indicate whether the terminal device supports initiating random access on a non-anchor carrier;

second capability information, used to indicate whether the terminal device supports using a preamble format 2; and third capability information, used to indicate whether the terminal device supports early data transmission EDT for user plane cellular internet of things evolved packet system CIT EPS optimization.

In a possible design, before the communication unit 502 receives the first paging message from the first network device, the communication unit 502 is further configured to: send the second information to the first network device.

For example, when the apparatus 500 implements a function of the first network device in the procedure shown in FIG. 3 or 4, the communication unit 502 is configured to receive a message 1 from the terminal device, where the message 1 includes a random access preamble;

the processing unit 501 is configured to determine first information, where the first information is used to schedule acknowledgement ACK/negative acknowledgement NACK feedback information of a message 2; and the communication unit 502 is configured to: send downlink control information DCI and the message 2 scheduled by the DCI to the terminal device, where the DCI and/or the message 2 include/includes the first information; and receive the ACK/NACK feedback information from the terminal device.

In a possible design, the DCI or the message 2 includes the first information, and the first information includes one or more of the following:

first indication information, where the first indication information is used to determine a subcarrier spacing of subcarriers for transmitting the ACK/NACK feedback information; and second indication information, where the second indication information is used to determine a repetition quantity of the ACK/NACK feedback information.

In a possible design, when the DCI includes the first information, the DCI includes at least one of a first field used to transmit the first indication information and a second field used to transmit the second indication information; and the first indication information is a status value of a bit included in the first field, and the second indication information is a status value of a bit included in the second field:

different status values of the bit included in the first field are used to indicate different subcarrier spacings; and different status values of the bit included in the second field are used to indicate different repetition quantities.

In a possible design, when the message 2 includes the first information, the first information further includes one or more of the following: third indication information, where the third indication information is used to determine a location of the subcarrier for transmitting the ACK/NACK feedback information: fourth indication information, where the fourth indication information is used to determine a scheduling delay of the ACK/NACK feedback information: fifth indication information, where the fifth indication information is used to determine target receive power of the ACK/NACK feedback information: sixth indication information, where the sixth indication information is used to determine a path loss compensation factor for transmitting the ACK/NACK feedback information; and seventh indication information, where the seventh indication information is used to determine a timing advance for transmitting the ACK/NACK feedback information.

In a possible design, the DCI includes time-frequency resource information of the ACK/NACK feedback information, and when the first information includes only the first indication information, the repetition quantity of the ACK/NACK feedback information is indicated by a system message or is set: or when the first information includes only the second indication information, the subcarrier spacing of the subcarriers for transmitting the ACK/NACK feedback information is indicated by a system message or is set.

In a possible design, the DCI and the message 2 include the first information, where the first information includes first indication information and second indication information, the DCI includes the first indication information, and the message 2 includes the second indication information: or the DCI includes the second indication information, and the message 2 includes the first indication information: the first indication information is used to determine a subcarrier spacing of subcarriers for transmitting the ACK/NACK feedback information; and the second indication information is used to determine a repetition quantity of the ACK/NACK feedback information.

In a possible design, before the communication unit 502 receives the message 1 from the terminal device, the communication unit 502 is configured to: receive a second paging message, where the second paging message includes second information, and the second information includes paging-related capability information possessed by the terminal device:

the processing unit 501 is further configured to: allocate a random access channel RACH resource to the terminal device based on the second information, and determine, based on the second paging message, a first paging message to be sent to the terminal device, where the first paging message includes resource indication information, and the resource indication information is used to indicate the RACH resource; and the communication unit 502 is further configured to send the first paging message to the terminal device.

In a possible design, the second information one or more of the following:

first capability information, used to indicate whether the terminal device supports initiating random access on a non-anchor carrier;

second capability information, used to indicate whether the terminal device supports using a preamble format 2; and third capability information, used to indicate whether the terminal device supports early data transmission EDT for user plane cellular internet of things evolved packet system CIOT EPS optimization.

In a possible design, before the communication unit 502 receives the second paging message from the second network device, the communication unit 502 is further configured to:

receive the second information from the terminal device, and send the second information to the second network device.

Figure 6:
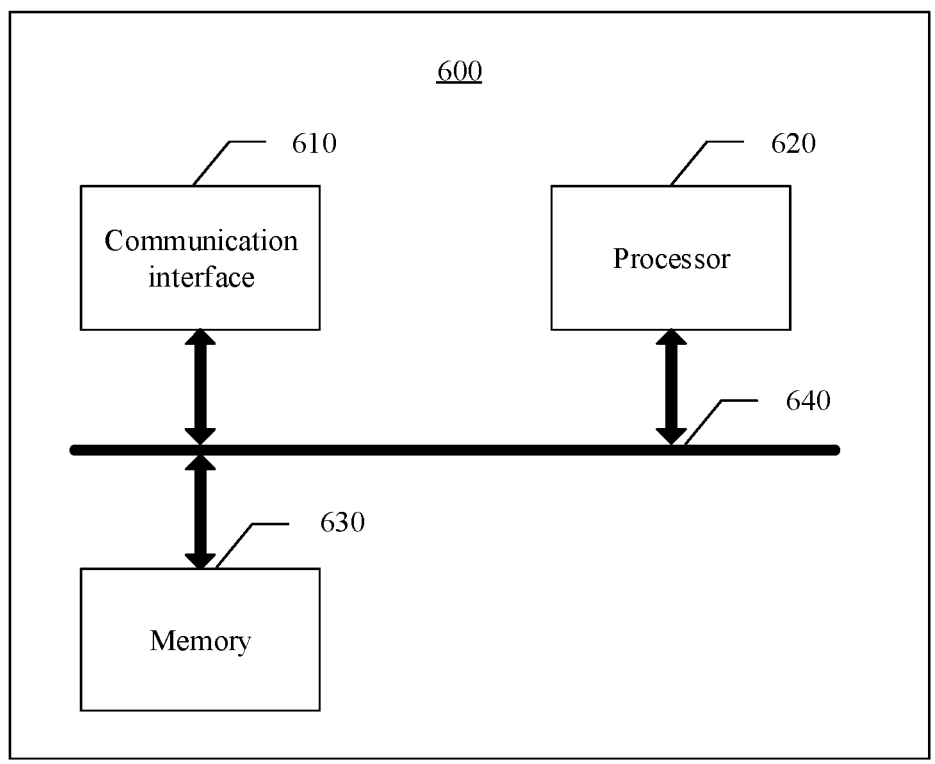
FIG. 6 is a schematic diagram of a structure of communication apparatus according to an embodiment of this application.

FIG. 6 shows an apparatus 600 according to an embodiment of this application. The apparatus shown in FIG. 6 may be an implementation of a hardware circuit of the apparatus shown in FIG. 5. The communication apparatus may be applied to the flowcharts shown in FIG. 3 and FIG. 4, and perform functions of the terminal device or the first network device in the foregoing method embodiments. For ease of description, FIG. 6 shows only main components of the communication apparatus.

The apparatus 600 shown in FIG. 6 includes at least one processor 620, configured to implement any method in FIG. 3 and FIG. 4 provided in the embodiments of this application.

The apparatus 600 may further include at least one memory 630, configured to store program instructions and/or data. The memory 630 is coupled to the processor 620. The coupling in this embodiment of this application is indirect coupling or a communication connection between apparatuses, units, or modules for information exchange between the apparatuses, the units, or the modules, and may be in electrical, mechanical, or other forms. The processor 620 may cooperate with the memory 630. The processor 620 may execute the program instructions stored in the memory 630. At least one of the at least one memory may be included in the processor.

The apparatus 600 may further include a communication interface 610, configured to communicate with another device by using a transmission medium, so that an apparatus in the apparatus 600 may communicate with another device. In this embodiment of this application, the communication interface may be a transceiver, a circuit, a bus, a module, or a communication interface of another type. In this embodiment of this application, the transceiver may be an independent receiver, an independent transmitter, a transceiver integrated with a transceiver function, or an interface circuit. The processor 620 sends and receives data by using the communication interface 610, and is configured to implement the method performed by the terminal device or the first network device in the embodiments corresponding to FIG. 3 and FIG. 4. For details, refer to the foregoing descriptions. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer-readable memory that can indicate the computer or another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A data transmission method comprising:
sending, by a terminal device, a random access preamble to a first network device,
wherein the random access preamble is useable by the first network device to send a random access response (RAR) to the terminal device upon successful detection of the random access preamble by the first network device:
receiving, by the terminal device, downlink control information (DCI) and the RAR scheduled by the DCI from the first network device,
wherein the RAR comprises downlink data,
wherein the DCI and/or the RAR comprise/comprises first information for scheduling transmission of acknowledgement (ACK)/negative acknowledgement (NACK) feedback information by the terminal device in response to receipt of the RAR, and
wherein the first information comprises (a) first indication information for determining subcarrier spacing of subcarriers for transmitting the ACK/NACK feedback information and/or (b) second indication information for determining a repetition quantity of the ACK/NACK feedback information;
determining, by the terminal device, a time-frequency resource, the subcarrier spacing, and/or the repetition quantity of the ACK/NACK feedback information; and
sending, by the terminal device, the ACK/NACK feedback information to the first network device based on the time-frequency resource, the subcarrier spacing, and/or the repetition quantity.

2. The method according to claim 1, wherein the DCI comprises time-frequency resource information of the ACK/NACK feedback information, and
in response to the first information comprising only the first indication information, the repetition quantity of the ACK/NACK feedback information is indicated by a system message or is set; and
in response to the first information comprising only the second indication information, the subcarrier spacing of the subcarriers for transmitting the ACK/NACK feedback information is indicated by a system message or is set.

3. The method according to claim 1, wherein in response to the RAR comprising only the first information, the first information further comprises one or more of the following:
third indication information for use in determining a location of the subcarrier for transmitting the ACK/NACK feedback information;
fourth indication information for use in determining a scheduling delay of the ACK/NACK feedback information;
fifth indication information for use in determining target receive power of the ACK/NACK feedback information;
sixth indication information for use in determining a path loss compensation factor for transmitting the ACK/NACK feedback information; and
seventh indication information for use in determining a timing advance for transmitting the ACK/NACK feedback information.

4. The method according to claim 1, wherein both the DCI and the RAR comprise the first information, wherein the DCI comprises the first indication information and the RAR comprises the second indication information.

5. The method according to claim 1, wherein before sending the random access preamble to the first network device, the method further comprises:
receiving, by the terminal device, a first paging message from the first network device,
wherein the first paging message comprises resource indication information,
wherein the resource indication information indicates a random access channel (RACH) resource allocated to the terminal device, and
wherein the RACH resource is used to carry the random access preamble; and
the RACH resource is allocated based on second information that comprises paging-related capability information possessed by the terminal device.

6. The method according to claim 5, wherein the second information comprises one or more of the following:
first capability information indicating whether the terminal device supports initiating random access on a non-anchor carrier;
second capability information indicating whether the terminal device supports using a preamble format 2; and
third capability information indicating whether the terminal device supports early data transmission (EDT) for user plane cellular internet of things (CIOT) evolved packet system (EPS) optimization.

7. A data transmission method comprising:
receiving, by a first network device, a random access preamble from a terminal device, wherein the random access preamble is useable by the first network device to send a random access response (RAR) to the terminal device upon successful detection of the random access preamble by the first network device;
sending, by the first network device, downlink control information (DCI) and the RAR scheduled by the DCI to the terminal device,
wherein the RAR comprises downlink data,
wherein the DCI and/or the RAR comprise/comprises first information for scheduling transmission of acknowledgement (ACK)/negative acknowledgement (NACK) feedback information by the terminal device in response to receipt of the RAR, and
wherein the first information comprises (a) first indication information for use by the terminal device to determine subcarrier spacing of subcarriers for transmitting the ACK/NACK feedback information and/or (b) second indication information for use by the terminal device to determine a repetition quantity of the ACK/NACK feedback information; and
receiving, by the first network device, the ACK/NACK feedback information from the terminal device based on a time-frequency resource, a subcarrier spacing, and/or a repetition quantity determined by the terminal device from the first information.

8. The method according to claim 7, wherein in response to the message 2 comprising the first information, the first information further comprises one or more of the following:
third indication information used for determining a location of the subcarrier for transmitting the ACK/NACK feedback information;
fourth indication information used for determining a scheduling delay of the ACK/NACK feedback information;
fifth indication information used for determining target receive power of the ACK/NACK feedback information;
sixth indication information used for determining a path loss compensation factor for transmitting the ACK/NACK feedback information; and
seventh indication information used for determining a timing advance for transmitting the ACK/NACK feedback information.

9. The method according to claim 7, wherein the DCI comprises time-frequency resource information of the ACK/NACK feedback information, and
in response to the first information comprising only the first indication information, the repetition quantity of the ACK/NACK feedback information is indicated by a system message or is set; and
in response to the first information comprising only the second indication information, the subcarrier spacing of the subcarriers for transmitting the ACK/NACK feedback information is indicated by a system message or is set.

10. The method according to claim 7, wherein both the DCI and the RAR comprise the first information, wherein the DCI comprises the first indication information and the RAR comprises the second indication information.

11. The method according to claim 7, wherein before receiving the random access preamble from the terminal device, the method further comprises:
receiving, by the first network device, a second paging message from a second network device,
wherein the second paging message comprises second information, and wherein the second information comprises paging-related capability information possessed by the terminal device:
allocating, by the first network device, a random access channel (RACH) resource to the terminal device based on the second information, and determining, based on the second paging message, a first paging message to be sent to the terminal device,
wherein the first paging message comprises resource indication information which indicates the RACH resource; and
sending, by the first network device, the first paging message to the terminal device.

12. The method according to claim 11, wherein the second information comprises one or more of the following:
first capability information indicating whether the terminal device supports initiating random access on a non-anchor carrier;
second capability information indicating whether the terminal device supports using a preamble format 2; and
third capability information indicating whether the terminal device supports early data transmission (EDT) for user plane cellular internet of things (CIoT) evolved packet system (EPS) optimization.

13. A communication apparatus comprising:
a transceiver configured to cooperate with a processor to:
send a random access preamble to a first network device,
wherein the random access preamble useable by the first network device to send a random access response (RAR) to the communication apparatus upon successful detection of the random access preamble by the first network device; and
receive downlink control information (DCI) and the RAR scheduled by the DCI from the first network device,
wherein the RAR comprises downlink data,
wherein the DCI and/or the RAR comprise/comprises first information for scheduling transmission of acknowledgement (ACK)/negative acknowledgement (NACK) feedback information in response to receipt of the RAR, and
wherein the first information comprises (a) first indication information for determining subcarrier spacing of subcarriers for transmitting the ACK/NACK feedback information and (b) second indication information for determining a repetition quantity of the ACK/NACK feedback information;
the processor is configured to determine a time-frequency resource, the subcarrier spacing, and/or the repetition quantity of the ACK/NACK feedback information based on the first information; and
the transceiver is further configured to cooperate with the processor to send the ACK/NACK feedback information to the first network device based on the determined time-frequency resource, the subcarrier spacing, and/or the repetition quantity.

14. The apparatus according to claim 5, wherein the DCI comprises time-frequency resource information of the ACK/NACK feedback information,
upon the first information comprising only the first indication information, the repetition quantity of the ACK/NACK feedback information is indicated by a system message or is set; and upon the first information comprising only the second indication information, the subcarrier spacing of the subcarriers for transmitting the ACK/NACK feedback information is indicated by a system message or is set.

15. The apparatus according to claim 5, wherein in response to the RAR comprising the first information, the first information comprises one or more of the following:
   third indication information used for determining a location of the subcarrier for transmitting the ACK/NACK feedback information;
   fourth indication information used for determining a scheduling delay of the ACK/NACK feedback information;
   fifth indication information used for determining target receive power of the ACK/NACK feedback information;
   sixth indication information used for determining a path loss compensation factor for transmitting the ACK/NACK feedback information; and
   seventh indication information used for determining a timing advance for transmitting the ACK/NACK feedback information.

16. The apparatus according to claim 13, wherein both the DCI and the RAR comprise the first information, wherein the DCI comprises the first indication information and the RAR comprises the second indication information.

17. The apparatus according to claim 13, wherein before the transceiver sends the random access preamble to the first network device, the transceiver is further configured to receive a first paging message from the first network device,
   wherein the first paging message comprises resource indication information, which that indicates a random access channel (RACH) resource allocated to the terminal device,
   wherein the RACH resource is used to carry the random access preamble, and is allocated based on second information, and the second information comprises paging-related capability information possessed by the terminal device.

18. The method according to claim 1, wherein the DCI comprises the second indication information and the RAR comprises the first indication information.

19. The method according to claim 7, wherein the DCI comprises the second indication information and the RAR comprises the first indication information.

20. The apparatus according to claim 13, the DCI comprises the second indication information and the RAR comprises the first indication information.

* * * * *

UNITED STATES PATENT AND TRADEMARK OFFICE
CERTIFICATE OF CORRECTION

PATENT NO. : 12,177,894 B2
APPLICATION NO. : 17/678844
DATED : December 24, 2024
INVENTOR(S) : Luo et al.

Page 1 of 1

It is certified that error appears in the above-identified patent and that said Letters Patent is hereby corrected as shown below:

In the Claims

Claim 1: Column 29, Line 52: "the first network device:" should read as -- the first network device; --.

Claim 6: Column 30, Line 66: "user plane cellular internet of things (CIOT) evolved" should read as -- user plane cellular internet of things (CIoT) evolved --.

Claim 11: Column 32, Line 4: "possessed by the terminal device:" should read as -- possessed by the terminal device; --.

Claim 17: Column 34, Line 8: "indication information, which that indicates a random" should read as -- indication information that indicates a random --.

Signed and Sealed this
Tenth Day of June, 2025

Coke Morgan Stewart
*Acting Director of the United States Patent and Trademark Office*